Patented Mar. 7, 1944

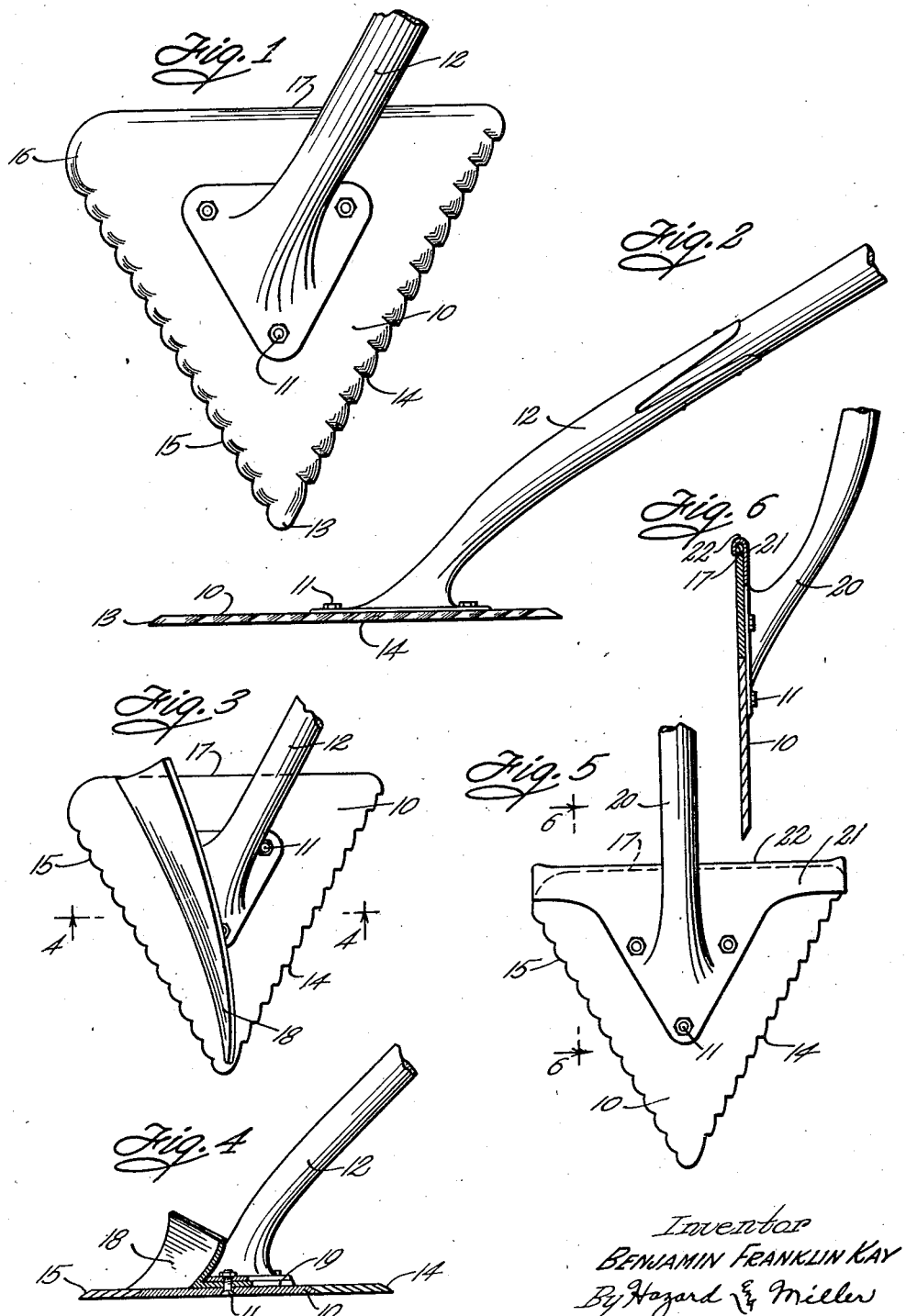

2,343,616

UNITED STATES PATENT OFFICE 2,343,616

LAWN AND GARDEN TOOL

Benjamin Franklin Kay, Los Angeles, Calif.

Application June 10, 1941, Serial No. 397,393

4 Claims. (Cl. 97—68)

This invention relates to a lawn and garden tool.

An object of the invention is to provide an improved tool that may be advantageously used in removing sod from lawns for various purposes, such as for renovating lawns.

More specifically, an object of the invention is to provide a lawn and garden tool, the blade of which is substantially flat and is generally triangular in plan, the sides of the blade being toothed with a handle extending upwardly and rearwardly from the top surface of the blade whereby by reason of the shape of the blade, it may be thrust horizontally underneath sod for purposes of removing it.

Further objects of the invention reside in having the teeth on one side of the blade forwardly directed, whereas the teeth on the opposite side of the blade are scalloped in shape. With this arrangement the forwardly directed teeth on being thrust beneath the sod tend to catch and cut through the sod roots. However, as these teeth are forwardly directed they offer somewhat more resistance to the forward thrust than the scalloped teeth. Consequently, there is a natural tendency for the tool to turn in such a manner as to properly cause the scalloped teeth to do a major portion of the cutting. These scalloped teeth offer less resistance to the forward thrust and as they are neither directed forwardly nor rearwardly but instead are neutrally shaped, they facilitate cutting on the rear or withdrawal stroke as the tool is swung laterally during the rearward stroke.

Still another object of the invention is to provide a tool having the above-mentioned characteristics wherein the length of the upwardly and rearwardly extending handle is in a plane substantially parallel to that side of the blade having the forwardly directed teeth.

Another object of the invention is to provide a tool that may be advantageously used in cutting and removing sod having the above-mentioned characteristics wherein the tool is equipped with a turning guard or share arranged adjacent the teeth having the scalloped shape so that as the sod is cut by the tool the guard or share effectively turns or rolls the sod laterally.

Another object of the invention is to provide a garden tool which may be used effectively for removing sod and which is also so shaped and designed that it may be advantageously used for spading purposes in hard ground.

With the foregoing and other objects in view, which will be made manifest in the following detailed description and specifically pointed out in the appended claims, reference is had to the accompanying drawing for an illustrative embodiment of the invention, wherein:

Figure 1 is a top plan view of the improved lawn and garden tool embodying the present invention, a portion of the handle being shown as broken away;

Fig. 2 is a view in side elevation of the same;

Fig. 3 is a view similar to Fig. 1, but illustrating the tool as equipped with the turning guard or share;

Fig. 4 is a sectional view taken substantially upon the line 4—4 upon Fig. 3;

Fig. 5 is a top plan view, a portion of the handle being broken away illustrating the blade as having a substitute handle applied thereto so as to convert the tool for use in spading; and Fig. 6 is a sectional view taken substantially upon the line 6—6 upon Fig. 5 in the direction indicated.

Referring to the accompanying drawing wherein similar reference characters designate similar parts throughout, the improved lawn and garden tool comprises a substantially flat blade 10 which is generally of triangular shape. Adjacent the center of the blade there may be bolt holes adapted to receive bolts 11 for attaching an upwardly and rearwardly extending handle 12. As clearly shown in Fig. 4, the bolts 11 preferably have countersunk heads on the underside of the blade.

The forward apex of the blade is indicated at 13 and one side of the blade is equipped with forwardly directed teeth 14 shaped by beveling the blade in the manner illustrated, so that these teeth have relatively sharp edges. The opposite side of the blade is also toothed as at 15, but these teeth, instead of being forwardly directed, are scalloped in shape so that they are neither forwardly nor rearwardly directed but may be regarded as neutral teeth. These teeth are likewise formed by beveling the edge of the plate so that the teeth have sharp cutting edges. The rear corner 16 is rounded and sharpened and the rear straight edge 17 is likewise preferably sharpened.

The handle 12 in the preferred form of construction extends upwardly and rearwardly in a plane substantially parallel to the edge of the blade that has the forwardly directed teeth 14.

When the tool as above described is used for removing or cutting sod it is thrust forwardly under the sod in a position wherein the flat blade 10 is substantially horizontal. The forwardly directed teeth 14 will cut through some of the roots of the sod encountered by these teeth. However, as these teeth are forwardly directed they offer greater resistance to the forward thrust than the scalloped or neutral teeth 15. Consequently, there is a natural tendency for the forwardly directed teeth to bring about a twisting or lateral swinging of the tool so that the major portion of the cutting or slicing beneath the sod is accomplished by the teeth 15.

In order to avoid the tool becoming too tiring on the user, the length of handle 12 is arranged in a vertical plane substantially parallel to the side bearing the forwardly directed teeth 14 with the result that when the tool is used there is a natural tendency to force the tool forwardly in a direction approaching the parallel of the toothed side 14. When the tool is thrust forwardly under the sod it effectively severs the sod in the path traversed by the tool. As the tool is withdrawn rearwardly it is also thrust laterally so as to cause the neutral teeth 15 to cut on the rear stroke. As will be noted from an inspection of Fig. 2 and the lower portion of Fig. 6, the teeth 14 and 15 are cut or are sharpened by filing across the edge of the blade at an angle thereto so that although the forwardly directed teeth 14 are forwardly directed in plan and the scalloped shaped teeth 15 are scalloped in plan, these teeth have sharpened edges on their forward sides near the bottom surface of the blade and sharpened edges at their rear sides that are near the top edges of the blade. These sharp edges near the top surface of the blade on the scalloped teeth 15 assist lateral and rearwardly directed cutting when the tool is thrust laterally and is withdrawn rearwardly. The cutting is also facilitated during this stroke by the sharpened rear corner 16. In some instances, the sharpened rear edge 17 is also brought into play during the rear stroke.

When the sod is removed as in the case of renovating lawns, the earth beneath the removed sod is left in a flat, smooth condition by the tool as distinguished from a pitted, uneven condition in the case where a conventional hoe is used for this purpose.

In Figs. 3 and 4, a modification is illustrated wherein the tool is equipped with a guard or share 18 which may have a base flange 19 positioned beneath the base of the handle 12 and the top of the blade 10. This flange may be secured or clamped in position by the tightening of the bolts 11. The body of the share begins adjacent the forward point 13 and curves upwardly and rearwardly toward the rear corner 16. This guard or share is designed to effectively roll or turn the sod that is cut by the tool, turning it laterally as it is cut.

In Figs. 5 and 6, a further modification is illustrated wherein the blade 10 is the same as that previously described. In this form of construction, however, a substitute handle is applied thereto, the substitute handle being indicated at 20 which extends upwardly and rearwardly from the top surface of the blade and is arranged in a vertical plane extending through the longitudinal center line through the blade. Integral with the handle is a guard 21 which extends over the top of the sharpened rear cutting edge 17 and provides a tread surface 22. Thus, by the substitution of this type of handle for handle 12, the tool may be readily converted into a type of spade that may be effectively utilized in spading extremely hard ground. The point 13 offers very little resistance to thrust the blade into extremely hard ground, and when the point penetrates the teeth 14 and 15 assist in cutting laterally through the ground as the blade is forced therein.

Manifestly, the tool as above described may be used for a large variety of purposes in addition to those above specifically described. The teeth on the blade can be used for sawing through relatively heavy roots if desired, and in some instances, the sharpened edge at the corner 16 can be advantageously used for trimming lawns at the edges of sidewalks and the like. In addition to these, the tool is susceptible of many other uses.

From the above-described construction it will be appreciated that the improved tool is of novel, simple, and advantageous design, and may be very efficiently and effectively used for numerous purposes, particularly for removing sod from lawns in renovating lawns.

While the tool has been illustrated with the toothed edges on the forward sides of the tool, it will be obvious that any handle may be applied to the tool in such a manner that the smooth sharpened edge 17 is one of the foremost edges. The bolt holes for the bolts 11 are equally spaced so that the handle may be applied to any three desired positions, whichever position may be most advantageous.

Various changes may be made in the details of construction without departing from the spirit or scope of the invention as defined by the appended claims.

I claim:

1. A lawn and garden tool comprising a substantially flat blade of general triangular shape, and a handle secured to the blade extending upwardly and rearwardly from the body of the blade, the side edges of the blade being toothed, the teeth on one side edge being directed forwardly while those on the other side edge are scalloped in shape.

2. A lawn and garden tool comprising a substantially flat blade of general triangular shape, and a handle secured to the blade extending upwardly and rearwardly from the body of the blade, the side edges of the blade being toothed, the teeth on one side edge being directed forwardly while those on the other side edge are scalloped in shape, the length of the handle being in a plane substantially parallel to the edge of the blade bearing the forwardly directed teeth.

3. A lawn and garden tool comprising a substantially flat horizontal blade of generally triangular shape, a handle secured to the upper side of the blade adjacent the center thereof extending upwardly and rearwardly from the body of the blade in a vertical plane substantially parallel to one of the edges of the blade, said edge presenting forwardly directed teeth and another edge presenting scalloped shaped teeth.

4. A lawn and garden tool comprising a substantially flat horizontal blade of generally triangular shape, a handle secured to the upper side of the blade adjacent the center thereof extending upwardly and rearwardly from the body of the blade in a vertical plane substantially parallel to one of the edges of the blade, said edge presenting forwardly directed teeth and another edge presenting scalloped shaped teeth, the scalloped shaped teeth presenting sharpened edges on the forward sides thereof near the bottom surface of the blade and sharpened edges on the rear sides of the teeth adjacent the top surface of the blade.

BENJAMIN FRANKLIN KAY.